(12) United States Patent
Paintal et al.

(10) Patent No.: US 8,661,414 B2
(45) Date of Patent: Feb. 25, 2014

(54) METHOD AND SYSTEM FOR TESTING AN ORDER MANAGEMENT SYSTEM

(75) Inventors: Guneet Paintal, New Delhi (IN); Vikram Somaraj, Kerala (IN)

(73) Assignee: Infosys Limited, Karnataka (IN)

( * ) Notice: Subject to any disclaimer, the term of this patent is extended or adjusted under 35 U.S.C. 154(b) by 827 days.

(21) Appl. No.: 12/503,645

(22) Filed: Jul. 15, 2009

(65) Prior Publication Data

US 2011/0016454 A1 Jan. 20, 2011

(51) Int. Cl.
*G06F 9/44* (2006.01)

(52) U.S. Cl.
USPC ........................................................ 717/127

(58) Field of Classification Search
None
See application file for complete search history.

(56) References Cited

U.S. PATENT DOCUMENTS

| | | | |
|---|---|---|---|
| 5,664,173 A * | 9/1997 | Fast | 707/694 |
| 2002/0161700 A1* | 10/2002 | Ernst et al. | 705/38 |
| 2004/0154001 A1* | 8/2004 | Haghighat et al. | 717/130 |
| 2008/0126867 A1* | 5/2008 | Pandarinathan et al. | 714/37 |

* cited by examiner

*Primary Examiner* — Henry Tsai
*Assistant Examiner* — Juanito Borromeo
(74) *Attorney, Agent, or Firm* — Michael Best & Friedrich LLP (57) ABSTRACT

The invention describes a method for testing the order management system. The order management system includes a set of sub-systems. An order life cycle is defined for the order management system, based on the set of sub-systems. The order management system is capable of processing one or more orders. A script is selected from a plurality of scripts, which are developed for testing the order management system, based on a test scenario. The script is modified if the order management system has undergone a modification. Thereafter, the script is used for testing the order management system. Each sub-system of the set of sub-systems is tested, based on the order life cycle and the script, to identify an error in a first sub-system of the set of sub-systems. An output is generated, based on the error identified in the first sub-system.

23 Claims, 8 Drawing Sheets

METHOD AND SYSTEM FOR TESTING AN ORDER MANAGEMENT SYSTEM

BACKGROUND

The present invention relates to the field of software testing. More specifically, the present invention relates to a method and system for testing an order management system.

Software testing is a technique used to verify the accuracy, completeness and quality of computer software. In software testing, two broad approaches are used—white-box testing and black-box testing. In white-box testing, the test developer knows about the internal structure of the source code of the target software to be tested. In black-box testing, also referred to as specification-based testing or behavioral testing, the test developer does not have access to the source code of the target software to be tested.

Several methods are used for white-box and black-box testing approaches. One of these methods includes regression testing, which is used to identify and eliminate errors caused by regression. These errors due to regression occur when the software does not function as desired or when the software has been modified.

Regression testing is performed to identify errors caused by regression when the software is being developed. Regression testing is also performed as the software is updated. In addition, regression testing is performed using various test cases to identify errors in the software. These test cases include data for testing the software. Further, the developer uses the test cases by executing regression testing commands.

There exist methods that involve the use of regression testing. One of these methods employs regression testing to test an order management system. An order management system processes orders placed by users. Examples of an order management system include, but are not limited to, a payment management system, a courier management system, and the like. The processing of an order involves various stages such as creation of an order, validation of the order, payment for the order, and so forth. Further, the processing of the order needs to be performed in a sequence. At various stages, the order management system interacts with different external systems to process the order through that stage. Examples of such external systems include, but are not limited to, credit card systems, courier systems, and the like.

The order management system needs to be tested during its development phase and when the order management system is modified. Since an order is processed in a sequence, the testing also needs to be performed in a sequence to ensure accuracy, completeness and quality of the order management system. However, during the development phase of the order management system, its various sub-systems may not be available for testing. For example, during the development phase of a courier management system, sub-systems for processing the creation and delivery of an order may have been developed, but sub-systems for processing the payment of the order may not have been developed. In this case, testing of the order management system cannot be performed until the payment system has been developed. Typically, order management systems are frequently modified. The order management system needs to be tested after every modification.

The methods mentioned above have one or more of the following limitations. First, the sub-systems of the order management system need to be tested in a sequence. Therefore, a sub-system cannot be tested before the sub-systems that precede this sub-system in the order life cycle are developed. Second, data setup for testing the order management system is performed manually. Further, the data setup needs to be performed every time the order management system needs to be tested. Consequently, testing may produce erroneous results. In addition, data setup needs to be performed each time the order management system needs to be tested, which is time consuming.

In light of the discussion above, there is a need for a method, system and computer program product for testing an order management system during its development phase. The new method should enable testing of the sub-systems without depending on their availability. Further, the new method should eliminate the need for setting up data manually, each time the order management system needs to be tested. In addition, the new method should reduce the time taken in testing the order management system and the data setup.

SUMMARY

An object of the invention is to provide a method for testing an order management system that includes a set of sub-systems, during its development phase, without depending on the availability of the sub-systems.

Another object of the invention is to eliminate the need for manual setup of data each time an order management system needs to be tested.

Yet another object of the invention is to reduce the time taken in testing an order management system and the time taken in setting up data for testing the order management system.

To achieve the objectives mentioned above, the invention provides a method for testing the order management system. The order management system is tested when it undergoes a modification or when faults develop in the order management system. The order management system includes a set of sub-systems. An order life cycle is defined for the order management system, based on the set of sub-systems. The method includes selecting a script from a plurality of scripts, based on a test scenario. The plurality of scripts have been developed for testing the order management system. The method further includes modifying the script if the order management system has been modified. Thereafter, the script is used for testing the order management system. Each sub-system of the set of sub-systems is tested, based on the order life cycle and the script, to identify an error in a first sub-system of the set of sub-systems. Subsequently, an output is generated, based on the testing of the order management system.

The invention describes another method for testing an order management system. The order management system is tested during its development phase. The order management system includes a set of sub-systems. Further, the order management system is developed for processing one or more orders. The method includes defining an order life cycle for the order management system, based on the set of sub-systems. The method further includes configuring the order management system, based on the defined order life cycle. Thereafter, a script is developed, based on a base file for testing the order management system for a test scenario. The base file includes a set of predefined inputs. Further, the script is used for testing the order management system. Each sub-system of the set of sub-systems is tested, based on the order life cycle and the script, to identify an error in at least one sub-system of the set of sub-systems. In addition, a response is simulated for one or more sub-systems of the set of sub-systems. Further, the response is simulated when the one or more sub-systems are unavailable. Subsequently, an output is generated, based on the testing of the order management system.

Consequently, the invention provides a method for testing the sub-systems of an order management system during the development phase without depending on the availability of the sub-systems. Therefore, the time taken in testing the order management system is reduced, since the sub-systems of the order management system can be tested without depending on their availability. Further, the invention eliminates the need for setting up data manually each time the order management system needs to tested, since the testing is performed on the basis of the script. Therefore, the time taken for testing is also reduced, since data need not be setup each time testing needs to be performed.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DETAILED DESCRIPTION OF DRAWINGS

Before describing the embodiments, in accordance with the invention, in detail, it should be observed that the embodiments reside primarily in the method and system employed for testing an order management system. Accordingly, the system components and method steps have been represented to only illustrate those specific details that are pertinent to understanding the embodiments of the invention, and not details that will be apparent to those with ordinary skill in the art.

The invention describes a method for testing the order management system. The order management system is tested when it undergoes a modification or when faults develop in the order management system. The order management system includes a set of sub-systems. Further, an order life cycle is defined for the order management system, based on the set of sub-systems. The order management system is capable of processing one or more orders. The method includes selecting a script from a plurality of scripts, based on a test scenario. The plurality of scripts are developed for testing the order management system. The method further includes modifying the script if the order management system has been modified. Thereafter, the script is used for testing the order management system. Each sub-system of the set of sub-systems is tested, based on the order life cycle and the script, to identify an error in a first sub-system of the set of sub-systems. Subsequently, an output is generated, based on the testing of the order management system.

The invention describes another method for testing an order management system. The order management system is tested during its development phase. The order management system includes a set of sub-systems. Further, the order management system is developed for processing one or more orders. The method includes defining an order life cycle for the order management system, based on the set of sub-systems. The method further includes configuring the order management system, based on the defined order life cycle. Thereafter, a script is developed, based on a base file, to test the order management system for a test scenario. The base file includes a set of predefined inputs. Further, the script is used for testing the order management system. Each sub-system of the set of sub-systems is tested, based on the order life cycle and the script, to identify an error in at least one sub-system of the set of sub-systems. In addition, a response is simulated for one or more sub-systems of the set of sub-systems. Further, the response is simulated when the one or more sub-systems are unavailable. Subsequently, an output is generated, based on the testing of the order management system.

The invention also describes a system for testing the order management system. The order management system includes a set of sub-systems. Further, an order life cycle has been defined for the order management system, based on the set of sub-systems. In addition, the order management system is capable of processing one or more orders. The system includes an input module configured for receiving a script. The script can be developed, based on a base file, to test the order management system for a test scenario. The script can also be selected from a plurality of scripts based on the test scenario. The script can also be a script that has been modified based on the test scenario. The system further includes a testing module configured for testing each sub-system of the order management system, based on the order life cycle and the script, to identify an error associated with at least one sub-system of the set of sub-systems. The testing module is also configured for simulating a response for one or more sub-systems, based on the scripts. The response is simulated when the one or more sub-systems are unavailable for processing the one or more orders. The system also includes an output module, which is configured for generating an output, based on the testing of the order management system.

The invention describes a computer program product for testing the order management system. The computer program product includes a computer usable medium, which has a computer readable program code embodied therein for testing the order management system. The order management system includes a set of sub-systems. Further, an order life cycle has been defined for the order management system, based on the set of sub-systems. In addition, the order management system is capable of processing one or more orders. The computer program product performs the step of receiving a script. The script can be a script that is developed on the basis of a base file, to test the order management system for a test scenario. The script can also be a script selected from a plurality of scripts, based on the test scenario. The script can also be a script that is modified on the basis of the test scenario. The computer program product further performs the step of testing each sub-system of the order management system, based on the order life cycle and the script, to identify an error associated with at least one sub-system of the set of sub-systems. The computer program product still further performs the step of simulating a response for one or more sub-systems, based on the scripts. The response is simulated when the one or more sub-systems are unavailable for processing the one or more orders. Thereafter, the computer program product performs the step of generating an output, based on the testing of the order management system.

Figure 1:
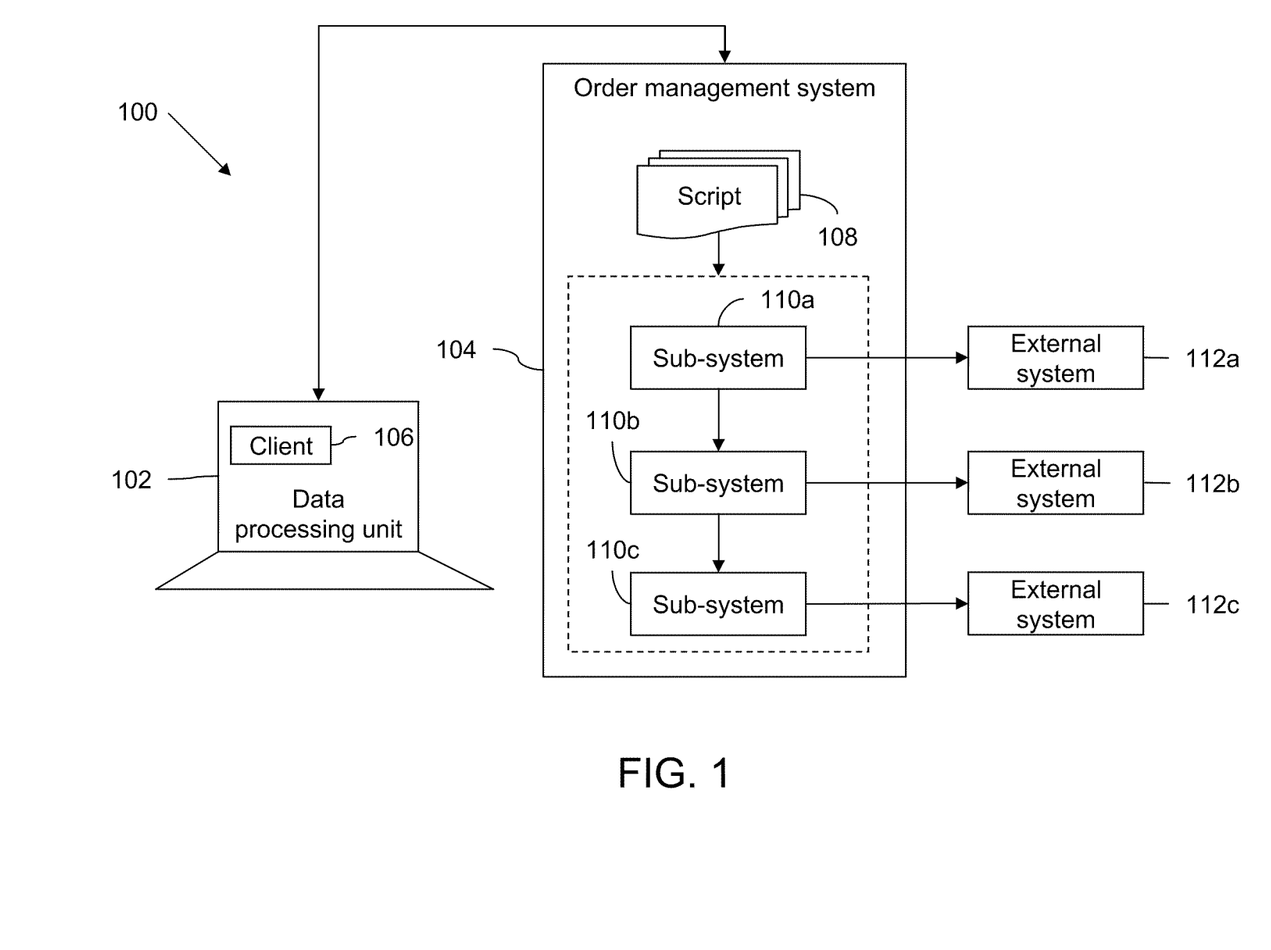
FIG. 1 illustrates an environment where various embodiments of the invention can be practiced.

FIG. 1 illustrates an environment 100 where various embodiments of the invention can be practiced. Environment 100 includes a Data Processing Unit (DPU) 102 and an order management system 104.

A user can interact with order management system 104 through DPU 102. In various embodiments of the invention, DPU 102 can be a system such as, but not limited to, a computer, a laptop, a Personal Digital Assistant (PDA), and the like. Typically, the user is a software developer of order management system 104. DPU 102 includes a client 106. In various embodiments of the invention, client 106 can be, but is not limited to, a software program, a software tool, and the like. Order management system 104 includes a script 108 provided by the user. The user can test order management system 104 through script 108.

Order management system 104 includes a set of sub-systems such as sub-system 110a, sub-system 110b and sub-system 110c for processing one or more orders. Although order management system 104 is shown to include sub-systems 110a, 110b and 110c, it will be apparent to a person skilled in the art that order management system 104 can include more sub-systems than shown in FIG. 1. Examples of a sub-system include, but are not limited to, an order creation sub-system, a fraud detection sub-system, a payment sub-system, a warehouse management sub-system, a delivery sub-system, and the like. Further, each sub-system of order management system 104 can be connected to a set of external systems such as external system 112a, external system 112b and external system 112c. Examples of such external systems include, but are not limited to, a credit card system, a courier system, and the like. Although order management system 104 is shown to be connected to external systems 112a, 112b and 112c, it will be apparent to a person skilled in the art that order management system 104 can be connected to more external systems than shown in FIG. 1. Order management system 104 processes an order requested by various users. The processing of the order involves various operations such as order creation, fraud detection, order payment, and so forth. Further, these operations are performed in a sequence. For example, in the processing of an order, the first operation is order creation. After the order has been created, the next operation is fraud detection. Thereafter, payment for the order is made, and so forth.

The user employs client 106 for using script 108 to test order management system 104. Script 108 can be present on client 106 for testing order management system 104 for various scenarios. Examples of such scenarios can be, but are not limited to, testing the sub-systems of order management system 104 during the development phase, testing order management system 104 when sub-system 110b has been modified, testing order management system 104 for performance, and the like.

Figure 2:
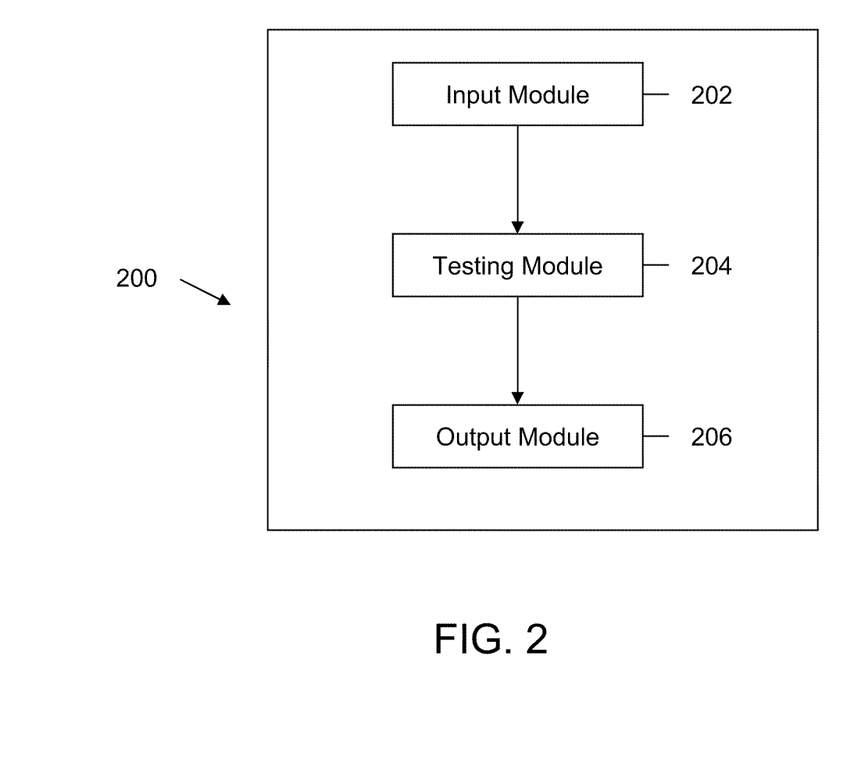
FIG. 2 is a block diagram of a system for testing an order management system, in accordance with an embodiment of the invention.

FIG. 2 is a block diagram of a system 200 for testing an order management system, such as order management system 104, in accordance with an embodiment of the invention. To describe system 200, reference will be made to FIG. 1, although it is understood that system 200 can be implemented with reference to any other suitable embodiment of the invention. System 200 can be employed in the form of a client, such as client 106, as shown in FIG. 1. System 200 includes an input module 202, a testing module 204 and an output module 206.

Input module 202 is configured for receiving a script such as script 108. The script includes test inputs for testing the order management system. The test inputs include test data and commands. In an embodiment of the invention, the test data represents data related to a mock order. For example, the test data can include data for order creation, credit card details, and the like, for buying a movie. The commands can be for creating the order, based on the data for order creation, making payment using the credit card details, and the like. In an embodiment of the invention, the script is an Extensible Markup Language (XML) file.

In an embodiment of the invention, the script received by input module 202 is developed by a user. Typically, the user is a software developer of order management system 104. Further, the script is developed on the basis of a base file. Typically, the base file includes a set of predefined inputs. For example, the predefined inputs can include, but are not limited to, the name of the server where the order management system is located, the port number of the server, database details of the order management system, and the like. In an embodiment of the invention, the base file is an XML file. In an embodiment of the invention, the script includes the set of predefined inputs. In addition, the script is developed, based on a predefined format of each sub-system. For example, the order creation sub-system and the order payment sub-system may require inputs in different formats. Similarly, the order creation sub-system and the order payment sub-system may provide outputs in different formats. Therefore, for testing the order creation sub-system, the order payment sub-system, and so forth, the script is created on the basis of the format of the corresponding sub-system.

The script is developed for testing the order management system for a test scenario. The order management system includes a set of sub-systems. An order life cycle is defined for the order management system, based on the set of sub-systems. The order life cycle defines a dependency flow among the set of sub-systems. Further, the order life cycles defines the role of each sub-system in the processing of the order. For example, the order management system handling the purchase of a movie ticket can include sub-systems such as sub-system 110a, sub-system 110b and sub-system 110c. Further, sub-system 110a can be an order creation sub-system, sub-system 110b can be an order payment sub-system, and sub-system 110c can be an order delivery sub-system. The order life cycle of the order management system defines that the creation of the order should be performed at the order creation sub-system. Thereafter, payment for the order needs to be made at the order payment sub-system. Subsequently, the order needs to be delivered through the order delivery sub-system.

The test scenario refers to a scenario for testing the order management system under certain conditions. In an embodiment of the invention, the test scenario refers to a scenario where the order management system is tested during its development phase. For example, the order management system needs to be tested for a scenario when only the order payment sub-system is available for testing. In an embodiment of the invention, the test scenario includes information related to one or more sub-systems of the set of sub-systems that are unavailable for testing. The one or more sub-systems may not be available for testing, since these sub-systems may not be configured at the time of testing. For example, during the testing of the order management system, the order creation sub-system and the order delivery sub-system have not been configured, thereby being unavailable for testing. In another embodiment of the invention, the test scenario includes a scenario where the order management system is tested when a sub-system of the set of sub-systems is updated. For example, the order management system needs to be tested when the order payment sub-system is updated. In yet another embodiment of the invention, the test scenario relates to a scenario for testing the order management system when the order management system does not perform as desired. For example, the order management system may provide an erroneous response that the payment for the order has been made by the user when, in fact, the user has not made the payment for the order.

In another embodiment of the invention, input module 202 receives a script selected from a plurality of scripts, based on the test scenario. Typically, the plurality of scripts are developed for testing the order management system for various test scenarios. In yet another embodiment of the invention, input module 202 receives a script that is modified on the basis of the test scenario. In an embodiment of the invention, the script is modified by the user. Further, the modification of the script is based on a modification in the order management system. For example, the script is modified when the order creation sub-system is modified by the user. In this case, the modified script corresponds to a scenario when a sub-system of the order management system has been modified.

The script received by input module 202 is used by testing module 204 to test the order management system. Testing module 204 is configured for testing each sub-system of the set of sub-systems. For example, testing module 204 tests the order creation sub-system, the order payment sub-system and the order delivery sub-system.

Testing module 204 is further configured for simulating a response for one or more sub-systems of the set of sub-systems. In an embodiment of the invention, the response for the one or more sub-systems is simulated when the one or more sub-systems are unavailable. The one or more sub-systems may be unavailable for testing if they are not configured at the time of testing. Alternatively, the one or more sub-systems can be unavailable when these sub-systems are identified to be faulty. For example, only the order payment sub-system in the order management system may not be available for testing. Testing module 204 simulates a response for the order payment sub-system, based on the test inputs. For example, testing module 204 simulates a response for the order payment sub-system. In this case, the response simulated indicates that the payment for the order has been made by the user. Further, the response and the test inputs are passed on to the order delivery sub-system. The response is simulated, based on the test data for the payment details and the commands for simulating the response included in the script.

Testing module 204 identifies an error associated with at least one sub-system of the set of sub-systems, based on the order life cycle and the script. Testing module 204 is further configured for parsing the script to extract test inputs. The error associated with at least one sub-system is identified, based on the test inputs. Testing module 204 provides test data and commands as an input to each sub-system of the set of sub-systems, to receive an output. Testing module 204 tests the set of sub-systems according to the dependency flow defined by the order life cycle. Further, testing module 204 analyzes the output received from each sub-system, to identify the error associated with at least one sub-system. For example, testing module 204 uses the test data and the commands included in the test inputs to test the order creation sub-system, the order payment sub-system and the order delivery sub-system. Testing module 204 tests the order creation sub-system followed by the order payment sub-system and finally the order delivery sub-system. Further, testing module 204 identifies an error associated with at least one sub-system of the set of sub-systems, based on the testing.

Output module 206 generates an output, based on the testing of the order management system. The output may be in the form of a list, a report, a display on a display screen, and the like. In an embodiment of the invention, the output includes information related to the error that is identified in at least one sub-system by testing module 204. In another embodiment of the invention, the output includes information in the form of a log generated during testing.

Figure 3:
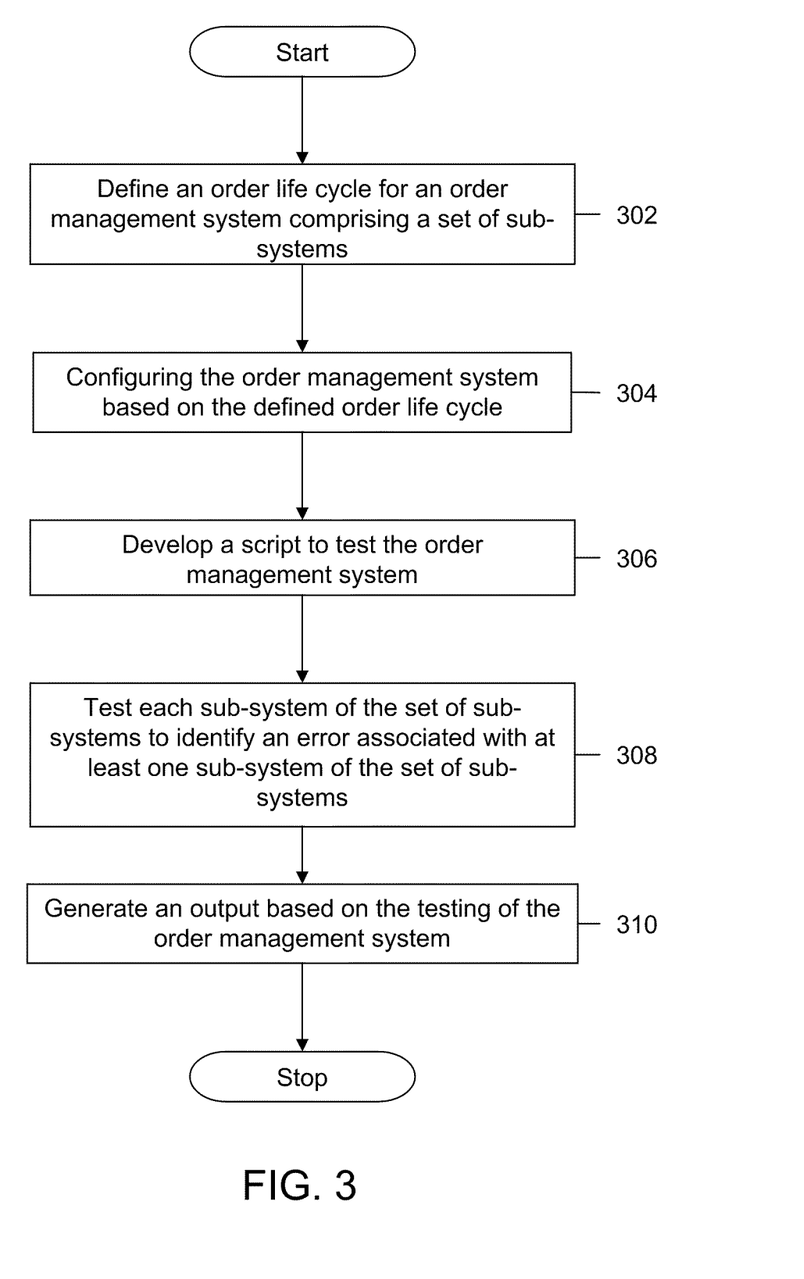
FIG. 3 is a flow diagram illustrating a method for testing the order management system, in accordance with an embodiment of the invention.

FIG. 3 is a flow diagram illustrating a method for testing the order management system, in accordance with an embodiment of the invention.

At 302, an order life cycle is defined for the order management system, based on the set of sub-systems. The order life cycle defines a dependency flow among the set of sub-systems. Further, the order life cycles defines the role of each sub-system in the processing of an order.

At 304, the order management system is configured, based on the order life cycle. The set of sub-systems is configured, based on the dependency flow defined by the order life cycle.

At 306, a script is developed for testing the order management system after the order management system has been configured. The script is developed, based on a base file, to test the order management system for a test scenario. The base file includes a set of predefined inputs. The test scenario refers to a scenario for testing the order management system under certain conditions. The script includes test inputs for testing the order management system. The test inputs include test data and commands. Further, the script is developed, based on a predefined format of each sub-system.

At 308, each sub-system of the set of sub-systems is tested on the basis of the script. Responses are simulated during the testing phase of the order management system for one or more sub-systems, based on the test inputs when the one or more sub-systems are unavailable. Further, testing is performed on the basis of the test inputs, to identify an error associated with at least one sub-system of the set of sub-systems.

At 310, an output is generated, based on the testing of the order management system. The output may be in the form of a list, a report, a display on a display screen, and the like. In an embodiment of the invention, the output includes information related to the error that is identified in at least one sub-system. In another embodiment of the invention, the output includes information in the form of a log generated during testing.

Figure 4:
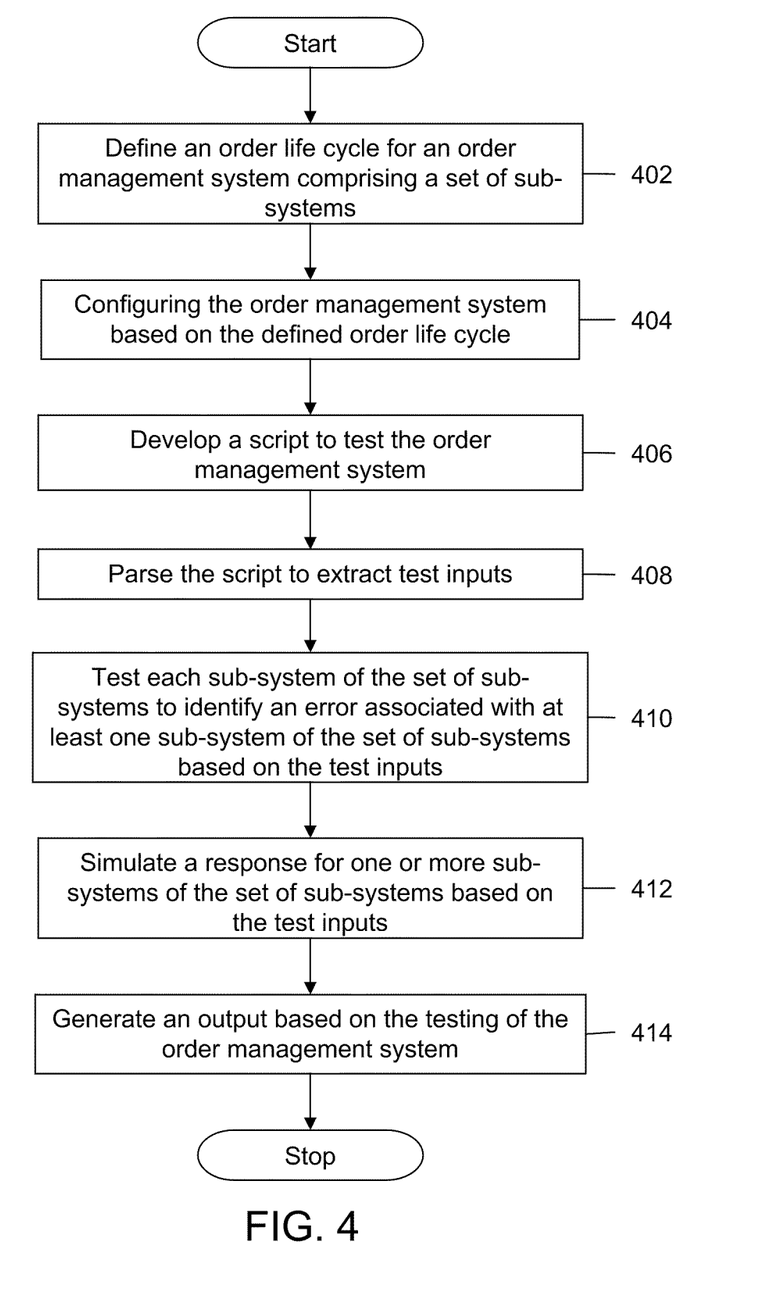
FIG. 4 is a flow diagram illustrating a method for testing the order management system, in accordance with another embodiment of the invention.

FIG. 4 is a flow diagram illustrating a method for testing the order management system, in accordance with another embodiment of the invention. To describe the method, reference will be made to FIGS. 1, 2 and 3, although it is understood that the method can be implemented with reference to any other suitable embodiment of the invention. Further, the method can contain a fewer or greater number of steps than shown in FIG. 4.

At 402, an order life cycle is defined for the order management system such as order management system 104. The order life cycle is defined, based on the set of sub-systems. In an embodiment of the invention, the order life cycle is defined by a user. The order life cycle defines a dependency flow among the set of sub-systems. Further, the order life cycle defines the role of each sub-system in the processing of an order.

At 404, the order management system is configured on the basis of the order life cycle. The set of sub-systems is configured, based on the dependency flow defined by the order life cycle. Typically, configuration of the order management system includes integration of the order management system with a set of external systems. In an embodiment of the invention, the order management system is configured by a user. Examples of external systems include, but are not limited to, credit card systems, courier systems, and the like. For example, the order management system handling the purchase of a movie ticket can include sub-systems such as sub-system 110a, sub-system 110b and sub-system 110c. Further, sub-system 110a can be an order creation sub-system, sub-system 110b can be an order payment sub-system, and sub-system 110c can be an order delivery sub-system. The order life cycle of the order management system defines that the creation of the order should be performed at the order creation sub-system. Thereafter, payment for the order needs to be made at the order payment sub-system. Subsequently, the order needs to be delivered through the order delivery sub-system.

At 406, a script such as script 108 is developed for testing the order management system after the order management system has been configured. The script includes test inputs for testing the order management system. The test inputs include test data and commands. In an embodiment of the invention, the test data represents data related to a mock order. For example, the test data can include data for creation of an order, credit card details, and the like, for buying a movie ticket. The commands can be for creating an order based on the data for order creation, making payment using the credit card details, and the like. In an embodiment of the invention, the script is an XML file.

The script is developed by a user, based on a base file, to test the order management system for a test scenario. Typically, the base file includes a set of predefined inputs. For example, the predefined inputs can include, but are not limited to, the name of the server of the order management system, the port number of the server, database details of the order management system, and the like. In an embodiment of the invention, the base file is an XML file. In an embodiment of the invention, the script includes a set of predefined inputs. In addition, the script is developed, based on a predefined format of each sub-system. For example, the order creation sub-system and the order payment sub-system may require inputs in different formats. Similarly, the order creation sub-system and the order payment sub-system may provide outputs in different formats. Therefore, for testing the order creation sub-system, the order payment sub-system, and so forth, the script is created on the basis of the format of the corresponding sub-system. In an embodiment of the invention, the script is developed during the development phase of the order management system, based on the format defined for the interaction of the order management system with the set of external systems.

In addition, the script is developed for testing the order management system for a test scenario. The test scenario relates to a scenario for testing the order management system under certain conditions. In an embodiment of the invention, the test scenario relates to a scenario where the order management system is tested during its development phase. For example, the order management system needs to be tested for a scenario when only the order payment sub-system is available for testing. In an embodiment of the invention, the test scenario includes information related to one or more sub-systems of the set of sub-systems that are unavailable for testing. The one or more sub-systems may not be available since these sub-systems may not be configured at the time of testing. For example, during the testing phase of the order management system, the order creation sub-system and the order delivery sub-system may not be available for testing, since these sub-systems may not have been configured. In an embodiment of the invention, the script is provided to input module 202 by the user for testing the order management system.

At 408, the script is parsed to extract test inputs. In an embodiment of the invention, parsing is performed by an XML parser. In another embodiment of the invention, Jython® is used for parsing the script. Jython® is a Java™ implementation of the Python® programming language. Typically, parsing of the script is performed by testing module 204.

At 410, each sub-system of the set of sub-systems is tested on the basis of the script. Each sub-system is tested, based on the test inputs. In an embodiment of the invention, testing of each sub-system is performed by testing module 204. In an embodiment of the invention, each sub-system is tested by invoking a corresponding Application Program Interface (API) for the sub-system, based on the test inputs. In an embodiment of the invention, integration of the sub-systems with the set of external systems is tested, based on the test inputs. For example, the interaction of the order payment sub-system with an external system such as a credit card system is tested. In this case, the order payment sub-system provides an input to the external system and receives a response from the external system. Further, testing module 204 tests whether the order payment sub-system provides the inputs and receives the outputs correctly.

At 412, responses are simulated for the one or more sub-systems, based on the test inputs. In an embodiment of the invention, responses are simulated by testing module 204. In an embodiment of the invention, the responses for the one or more sub-systems are simulated when the one or more sub-systems are unavailable. The one or more sub-systems may be unavailable for testing if they are not configured at the time of testing. For example, only the order payment sub-system in the order management system may be available for testing. Testing module 204 simulates a response for the order payment sub-system, based on the test inputs. For example, testing module 204 simulates a response for the order payment sub-system. In this case, the response simulated indicates that the payment for the order has been made by the user. Further, the response and the test inputs are passed on to the order delivery sub-system. The response is simulated on the basis of the test data for payment details and the commands for simulating the response included in the script.

Testing is performed on the basis of test inputs, to identify an error associated with at least one sub-system of the set of sub-systems. The error associated with at least one sub-system is identified on the basis of the test inputs. In an embodiment of the invention, testing module 204 provides test data and commands as an input to each sub-system of the set of sub-systems, to receive an output. Testing module 204 tests the set of sub-systems according to the dependency flow defined by the order life cycle. Further, testing module 204 analyzes the output received from each sub-system to identify the error associated with at least one sub-system. For example, testing module 204 uses the test data and commands included in the test inputs to test the order creation sub-system, the order payment sub-system and the order delivery sub-system. Testing module 204 tests the order creation sub-system followed by the order payment sub-system and finally the order delivery sub-system. Further, testing module 204 identifies that an error is associated with at least one sub-system of the set of sub-systems, based on the testing.

At 414, an output is generated on the basis of the testing of the order management system. Further, output is generated for testing, based on the script. The output may be in the form of a list, a report, a display on a display screen, and the like. In an embodiment of the invention, the output includes information related to the error identified in at least one sub-system. In another embodiment of the invention, the output includes information in the form of a log generated during testing. In an embodiment of the invention, the output is generated by output module 206.

Figure 5:
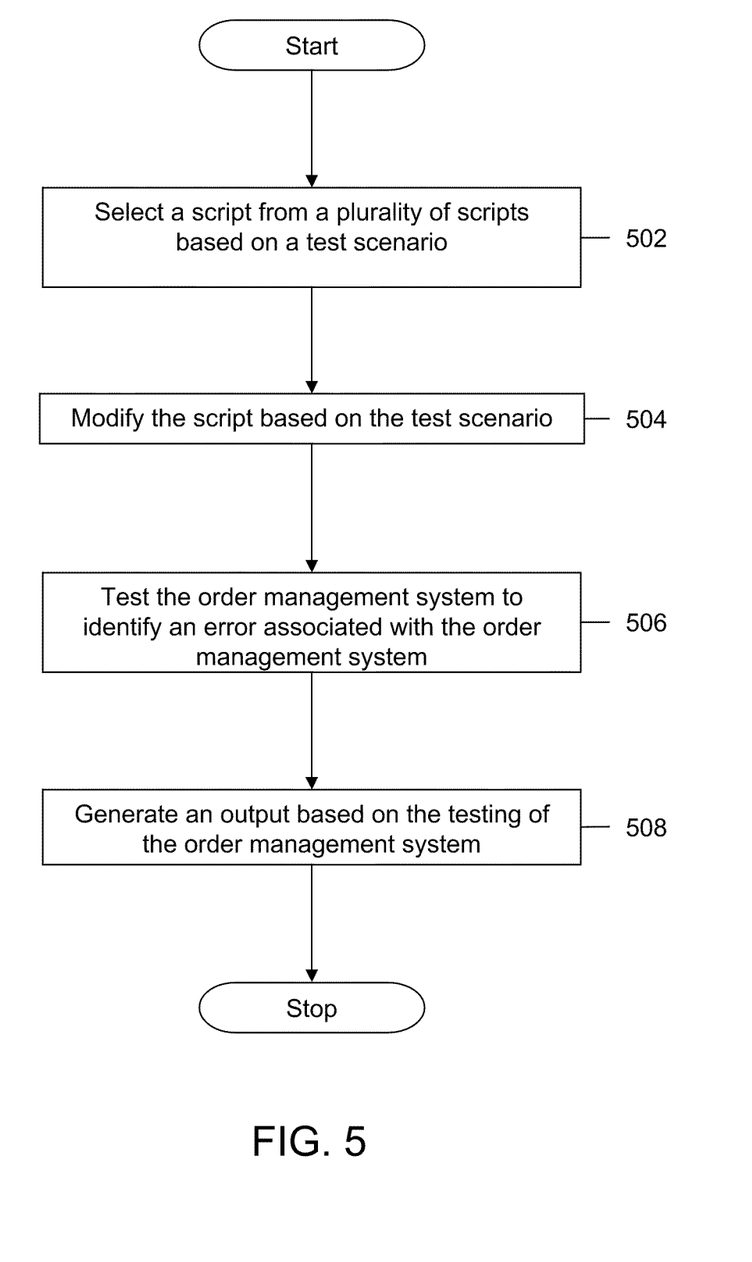
FIG. 5 is a flow diagram of a method for testing the order management system, in accordance with yet another embodiment of the invention.

FIG. 5 is a flow diagram illustrating a method for testing the order management system, in accordance with yet another embodiment of the invention. The order management system includes a set of sub-systems. An order life cycle is defined for the order management system, based on the set of sub-systems. The order life cycle defines a dependency flow among the set of sub-systems. The order life cycle further defines the role of each sub-system of the set of sub-systems in the processing of an order.

At 502, a script is selected from a plurality of scripts, based on a test scenario, to test the order management system for the test scenario. Each of the plurality of scripts is developed, based on a base file for a test scenario. The base file includes a set of predefined inputs.

At 504, the user modifies the script if the test scenario relates to a scenario where the order management system is modified. However, if the test scenario relates to a scenario where the order management system is tested for performance, testing is performed, based on the selected script.

At 506, the order management system is tested, based on the script, which is based on the test scenario. In an embodiment of the invention, the script is a script that is modified, based on the test scenario. In another embodiment of the invention, the script is a script that is selected from the plurality of scripts. The script includes test inputs for testing the order management system. Each sub-system is tested, based on the order life cycle and the script. Further, testing is performed to identify an error associated with a first sub-system of the set of sub-systems.

At 508, an output is generated, based on the testing of the order management system. The output may be in the form of a list, a report, a display on a display screen, and the like.

Figure 6A:
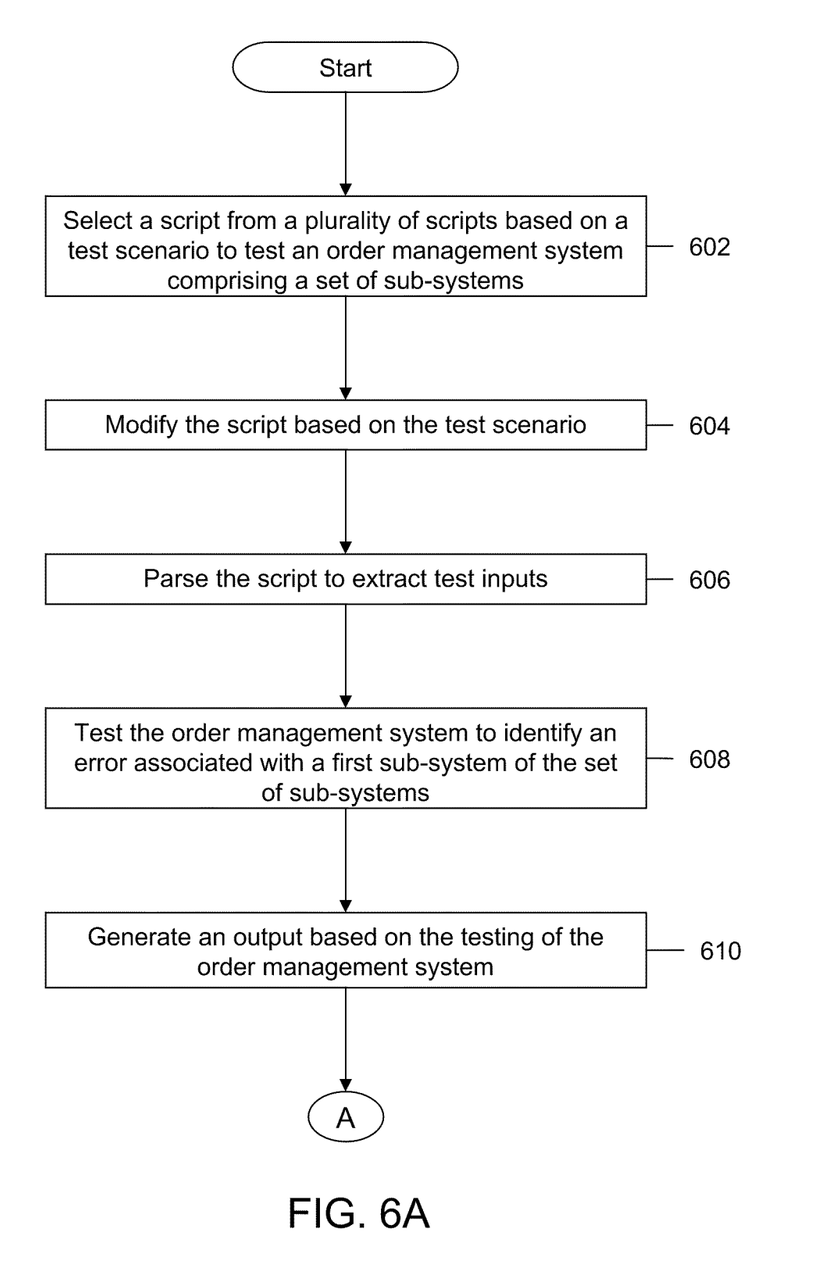
FIGS. 6A and 6B is a flow diagram illustrating a method for testing the order management system, in accordance with still another embodiment of the invention.
Figure 6B:
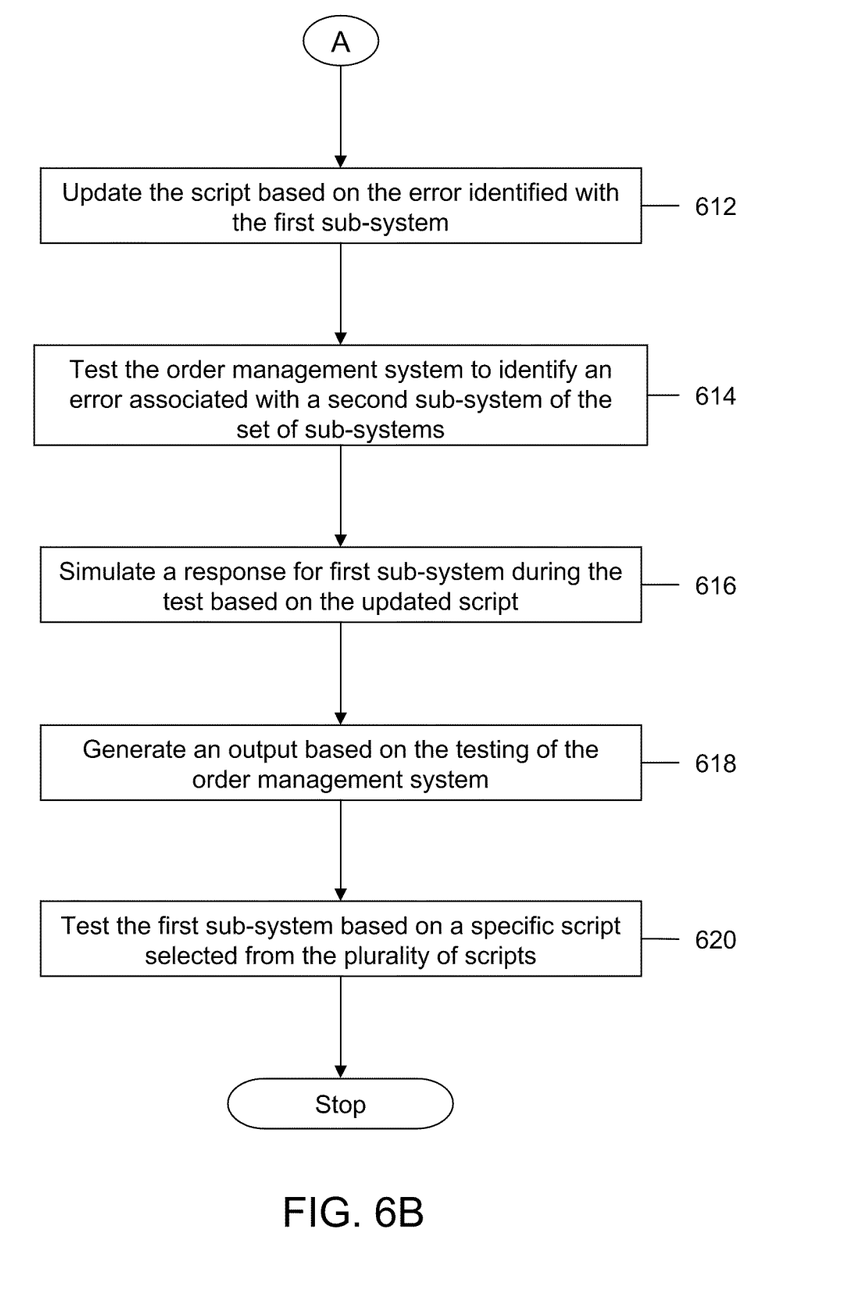

FIGS. 6A and 6B is a flow diagram illustrating a method for testing the order management system, in accordance with still another embodiment of the invention. To describe the method, reference will be made to FIGS. 1, 2 and 5, although it is understood that the method can be implemented with reference to any other suitable embodiment of the invention. Further, the method can contain a fewer or greater number of steps than shown in FIGS. 6A and 6B.

The order management system can be an order management system such as order management system 104 and includes a set of sub-systems. An order life cycle is defined for the order management system, based on the set of sub-systems. The order life cycle defines a dependency flow among the set of sub-systems. The order life cycle further defines the role of each sub-system of the set of sub-systems in the processing of an order. Further, the order management system is integrated with a set of external systems.

At 602, a script such as script 108 is selected from a plurality of scripts, based on a test scenario. Further, the script is selected to test the order management system for the test scenario. Typically, each script of the plurality of scripts is developed by a user on the basis of a base file. In an embodiment of the invention, the base file includes a set of predefined inputs. For example, the predefined inputs can include, but are not limited to, a server name, a port name, and the like. Further, each script is developed, based on a predefined format of each sub-system of the set of sub-systems. For example, the order creation sub-system may require inputs in one format and the order payment sub-system may require inputs in another format. In this case, the order creation sub-system may provide a response in one format, the order payment sub-system may provide a response in another format, and so forth. Therefore, for testing the order creation sub-system, the order payment sub-system, and so forth, the script is created, based on the format of the corresponding sub-system. Further, each script of the plurality of scripts is developed for a test scenario. The test scenario relates to a scenario for testing the order management system under certain conditions. In an embodiment of the invention, the test scenario includes a scenario where the order management system is tested when a sub-system of the set of sub-systems is updated. For example, the order management system needs to be tested when the order payment sub-system is updated. In another embodiment of the invention, the test scenario relates to a scenario for testing the order management system when the order management system does not perform as desired. For example, the order management system may provide an erroneous response indicating that the payment for the order has been made by the user when, in fact, the user has not made the payment for the order.

At 604, the user modifies the script if the test scenario includes testing the order management system after the order management system has been modified. For example, when the test scenario relates to a scenario where the order management system is tested when the order payment sub-system is updated, the user modifies the script, based on the modification made in the order payment sub-system. Further, the order management system is tested, based on the modified script. However, if the test scenario includes testing the order management system for performance, testing is performed by the selected script. For example, when the test scenario relates to testing the order management system when the order management system generates an erroneous response, the order management system is tested on the basis of the selected script. In an embodiment of the invention, the script is received by input module 202 of system 200.

The script includes test inputs for each sub-system. Typically, the test inputs include test data and commands. Further, the test inputs are used for testing the order management system. In an embodiment of the invention, the test data represents data related to a mock order. For example, the test data can include data for creation of an order, credit card details, and the like, for buying a movie ticket. The commands can be for creating the order, based on the data for order creation, making payment using the credit card details, and the like. In an embodiment of the invention, the script is an XML file.

The script is parsed to extract the test inputs at 606. In an embodiment of the invention, parsing is performed by an XML parser. In another embodiment of the invention, Jython® is used for parsing the script. Jython® is a Java™ implementation of the Python® programming language. Typically, parsing of the script is performed by testing module 204. In an embodiment of the invention, parsing of the script is performed by testing module 204.

At 608, each sub-system of the set of sub-systems is tested to identify an error associated with a first sub-system of the set of sub-systems. For example, the first sub-system can be the order payment sub-system or the order delivery sub-system. Further, testing is performed, based on the test inputs parsed at 606. The error associated with the first sub-system is identified, based on the test inputs. In an embodiment of the invention, testing module 204 provides test data and commands as an input to each sub-system, to receive an output. Testing module 204 tests the set of sub-systems according to the dependency flow defined by the order life cycle. Further, testing module 204 analyzes the output received from each sub-system to identify the error associated with the first sub-system. For example, testing module 204 uses the test data and commands included in the test inputs to test the order creation sub-system, the order payment sub-system and the order delivery sub-system. Testing module 204 tests the order creation sub-system followed by the order payment sub-system and finally the order delivery sub-system. Further, testing module 204 identifies that an error is associated with the first sub-system, based on the testing.

At 610, an output is generated, based on the testing of the order management system. The output may be in the form of a list, a report, a display on a display screen, and the like. In an embodiment of the invention, the output includes information related to the error identified. In another embodiment of the invention, the output includes information related to a log generated on the basis of testing. In an embodiment of the invention, the output is generated by output module 206.

At 612, the script is updated by the user, based on the error identified in the first sub-system. In an embodiment of the invention, the updated script is received by input module 202. The updated script is then parsed to extract updated test inputs by testing module 204.

At 614, the updated script is used to test the sub-systems of the order management system that follow the first sub-system in the order life cycle, to identify an error associated with a second sub-system of the set of sub-systems. In an embodiment of the invention, testing is performed by testing module 204 to identify an error associated with a second sub-system of the set of sub-systems.

At 616, a response is simulated for the first sub-system, based on the updated scripts. In an embodiment of the invention, testing module 204 simulates the response for the first sub-system, based on the updated test inputs. For example, the error identified indicates that the first sub-system is the payment system and does not return any response on the basis of the test inputs. In this case, testing module 204 simulates that the payment has been made for the order for the first sub-system.

At 618, an output is generated, based on the testing of the order management system with the updated script. The output may be in the form of a list, a report, a display on a display screen, and the like. In an embodiment of the invention, the output includes information related to the error identified. In another embodiment of the invention, the output includes information related to a log generated, based on the testing. In an embodiment of the invention, the output is generated by output module 206.

At 620, the first sub-system is tested, based on a specific script selected from the plurality of scripts. A specific script is selected for detailed testing of the first sub-system. Further, detailed testing is performed to identify specific information related to the error. For example, detailed testing is performed if the order creation sub-system is identified to be faulty. In this case, detailed testing of the order creation sub-system returns that the error is located at the step where the order creation sub-system tries to register the order.

In an embodiment of the invention, the user configures the first sub-system, based on the error identified. Further, the user tests the order management system after configuring the first sub-system. In another embodiment of the invention, the user tests the sub-systems in the order life cycle that follow the first sub-system, by simulating a response for the first sub-system.

Figure 7:
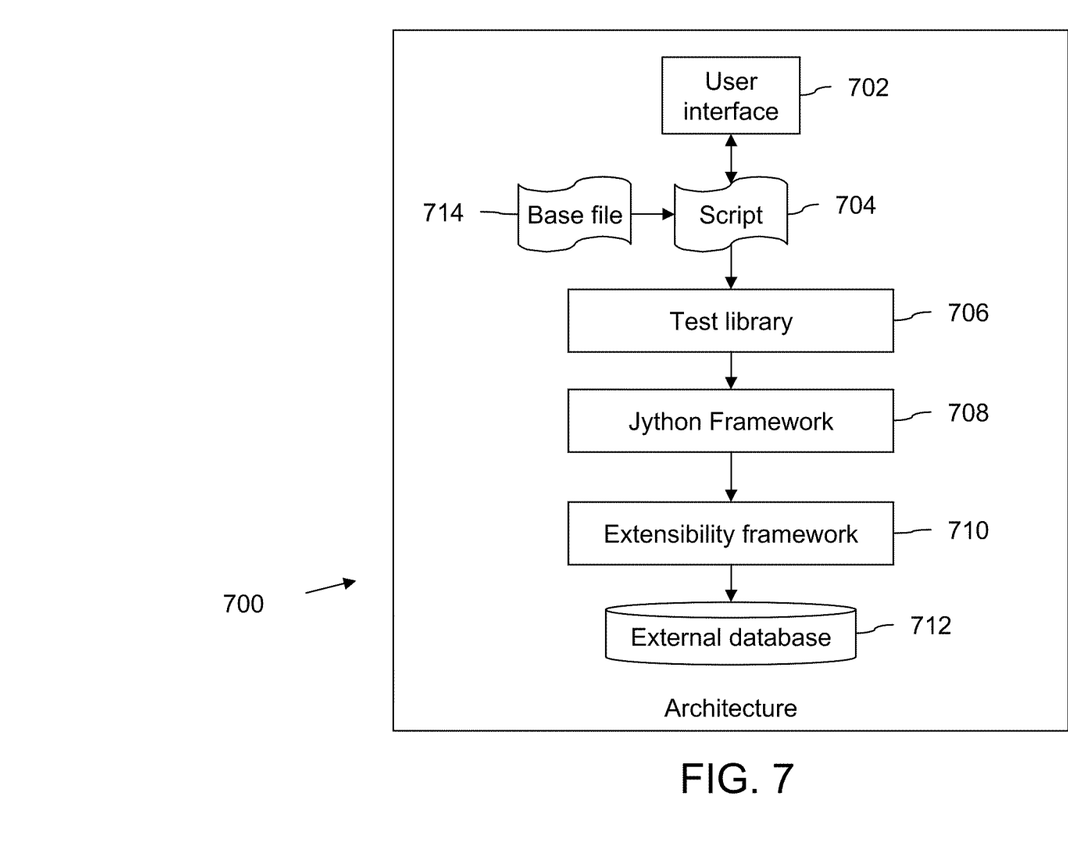
FIG. 7 is a block diagram illustrating the architecture of a system for testing an order management system, in accordance with an embodiment of the invention.

FIG. 7 illustrates the architecture of a system 700 for testing an order management system, in accordance with an embodiment of the invention. System 700 includes a user interface 702, a script 704, a test library 706, a Jython framework 708, an extensibility framework 710, and an external database 712.

User interface 702 enables a user to provide a script such as script 704 for testing the order management system. User interface 702 displays the execution of the script. For example, user interface 702 indicates the testing of the order management system, based on the script. The user provides the script that has been developed using a base file 714. Typically, base file 714 includes a set of predefined inputs. For example, the predefined inputs can include, but are not limited to, the name of the server of the order management system, the port number of the server, database details of the order management system, and the like. Test library 706 includes a set of commands. In an embodiment of the invention, the set of commands is defined based on Jython®. The script includes test inputs. In an embodiment of the invention, test inputs include commands such as one or more commands of the set of commands. Thereafter, Jython framework 708 provides a scripting language for test libraries such as test library 706. Typically, Jython framework 708 works in conjunction with test library 706. In an embodiment of the invention, Jython framework 708 parses the script to extract test inputs. In another embodiment of the invention, Jython framework 708 executes the commands in the test inputs.

Extensibility framework 710 includes various APIs which can be invoked to perform actions such as create order, create shipment, schedule order, and the like. The APIs are invoked, based on the script and Jython framework 708. Extensibility framework 710 stores information in external database 712. Further, when an error is identified in the order management system, the error is displayed on user interface 702.

As described above, the invention provides a method and system for testing an order management system including a set of sub-systems. The method includes testing the order management system, based on the script. Further, the script includes test inputs used for testing each sub-system of the set of sub-systems. The script can be used for simulating a response for one or more sub-systems of the set of sub-systems, which are unavailable, thereby enabling a user to test the sub-systems in the order management system without depending on the availability of all the sub-systems. The method enables the user to select a script from a plurality of scripts. Therefore, the user need not develop the script again to test the order management system. Further, the user can test a modified order management system by selecting a script from the plurality of scripts and making modifications in the script. Since the method provides the flexibility of testing the sub-systems of the order management system without depending on all the sub-systems, the time taken for testing is reduced. Further, since the user tests the order management system, based on a script selected from the plurality of scripts, the need for repetitively setting up data is eliminated, thereby reducing the time spent on data setup.

The method and system for testing the order management system, as described in the invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the invention.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, an optical disk drive, etc. The storage device can also be other similar means of loading computer programs or other instructions in the computer system. The computer system also includes a communication unit. The communication unit enables the computer to connect to other databases and the Internet through an I/O interface. The communication unit enables transfer as well as reception of data from other databases. The communication unit may include a modem, an Ethernet card, or any similar device which enables the computer system to connect to databases and networks such as LAN, MAN, WAN and the Internet. The computer system facilitates inputs from a user through an input device, which is accessible to the system through the I/O interface.

The computer system executes a set of instructions that is stored in one or more storage elements, to process input data. The storage elements may also hold data or other information as desired. A storage element may be in the form of an information source or a physical memory element in the processing machine.

The set of instructions may include various commands that instruct the processing machine to perform specific tasks such as the steps that constitute the method of the invention. The set of instructions may be in the form of a software program. Further, the software may be in the form of a collection of separate programs, a program module with a large program or a portion of a program module, as described in the invention. The software may also include modular programming in the form of object-oriented programming. Processing of input data by the processing machine may be in response to user commands, results of previous processing or a request made by another processing machine.

While the preferred embodiments of the invention have been illustrated and described, it will be clear that the invention is not limited to only these embodiments. Numerous modifications, changes, variations, substitutions and equivalents will be apparent to those skilled in the art without departing from the spirit and scope of the invention, as described in the claims.

What is claimed is:

1. A method for testing an order management system, the order management system comprising a set of sub-systems, wherein an order life-cycle is defined for the order management system based on a dependency flow among the set of sub-systems, the order management system capable of processing one or more orders, the method comprising:
    a. selecting a script from a plurality of scripts based on a test scenario, wherein the plurality of scripts are developed for testing the order management system, further wherein the script comprises test inputs;
    b. modifying the script based on the test scenario if the order management system has been modified, the script being modified based on the modified order management system;
    c. testing each sub-system of the set of sub-systems based on the order life cycle and the modified script to identify an error associated with a first sub-system of the set of sub-systems, wherein the testing comprises:
        simulating a response for one or more sub-systems of the set of sub-systems based on the script, wherein the response is simulated when the one or more sub-systems are unavailable for processing the one or more orders; and
    d. generating an output based on the testing of the order management system.

2. The method of claim 1, wherein each of the plurality of scripts is developed based on a base file for a test scenario, further wherein each of the plurality of scripts is developed based on a predefined format defined for each sub-system.

3. The method of claim 1, wherein testing comprises parsing the script to extract the test inputs, wherein the test inputs comprise test data and commands that are used to test each sub-system.

4. The method of claim 1, wherein the output comprises information related to the error identified with the first sub-system.

5. The method of claim 1 further comprises testing the first sub-system based on a specific script selected from the plurality of scripts.

6. The method of claim 1 further comprising:
    a. updating the script based on the error identified;
    b. testing each sub-system of the set of sub-systems based on the order life cycle and the updated script to identify an error associated with a second sub-system of the set of sub-systems, wherein the testing comprises:
        simulating a response for the first sub-system based on the updated script; and
    c. generating an output based on the testing of the order management system.

7. A method for testing an order management system, the order management system comprising a set of sub-systems, the order management system capable of processing one or more orders, the method comprising:
    a. defining an order life cycle for the order management system based on the set of sub-systems;
    b. configuring the order management system based on the defined order life cycle;
    c. developing a script based on a base file, wherein the script is developed to test the order management system for a test scenario, further wherein the script comprises test inputs;
    d. testing each sub-system of the set of sub-systems based on the order life cycle and the script to identify an error associated with at least one sub-system of the set of sub-systems, wherein the testing comprises:
        simulating a response for one or more sub-systems of the set of sub-systems based on the script, wherein the response is simulated when the one or more sub-systems are unavailable for processing the one or more orders; and
    e. generating an output based on the testing of the order management system.

8. The method of claim 7, wherein defining the order life cycle comprises establishing a dependency flow among the set of sub-systems.

9. The method of claim 7, wherein configuring the order management system comprises integrating the order management system with a set of external systems based on the order life cycle.

10. The method of claim 7, wherein the script is developed by a user.

11. The method of claim 7, wherein the script is developed based on a predefined format defined for each sub-system.

12. The method of claim 7, wherein testing the order management system comprises parsing the script to extract the test inputs, wherein the test inputs comprise test data and commands that are used to test each sub-system.

13. The method of claim 7, wherein the output comprises information related to the error identified with the at least one sub-system.

14. A system for testing an order management system, the order management system comprising a set of sub-systems, wherein an order life cycle is defined for the order management system based on the set of sub-systems, the order management system capable of processing one or more orders, the order management system comprising:

an input module, the input module configured for receiving a script, wherein the script is one of:
  a script developed based on a base file to test the order management system for a test scenario;
  a script selected from a plurality of scripts; and
  a script that is modified based on the test scenario;
a testing module configured for:
  testing each sub-system of the set of sub-systems based on the order life cycle and the script to identify an error associated with at least one sub-system of the set of sub-systems; and
  simulating a response for one or more sub-systems of the set of sub-systems based on the script, wherein the response is simulated when the one or more sub-systems are unavailable for processing the one or more orders; and
an output module configured for generating an output based on the testing of the order management system.

15. The system of claim 14, wherein the testing module is further configured for parsing the script to extract the test inputs, wherein the test inputs comprise test data and commands that are used to test each sub-system.

16. The system of claim 14, wherein the output comprises information related to the error identified with the at least one sub-system.

17. The system of claim 14, wherein the testing module is further configured to test the at least one sub-system.

18. The system of claim 14, wherein the script and the base file are XML files.

19. The system of claim 14, wherein the base file comprises a set of definitions and variables.

20. The system of claim 14, wherein the test scenario comprises processing of at least one order by the order management system.

21. The system of claim 14, wherein the script is developed by a user.

22. A computer program product for use with a stored program computer, the computer program product comprising a tangible usable medium having a computer readable program code embodied therein for testing an order management system, the order management system comprising a set of sub-systems, wherein an order life-cycle is defined for the order management system based on the set of sub-systems, further wherein the order management system is configured for processing one or more orders, the computer readable program code performing the steps of:
  a. receiving a script, wherein the script is one of:
    i. a script developed based on a base file to test the order management system for a test scenario;
    ii. a script selected from a plurality of scripts; and
    iii. a script that is modified based on the test scenario;
  b. testing each sub-system of the set of sub-systems based on the order life cycle and the script to identify an error associated with at least one sub-system of the set of sub-systems;
  c. simulating a response for one or more sub-systems of the set of sub-systems based on the script, wherein the response is simulated when the one or more sub-systems are unavailable for processing the one or more orders; and
  d. generating an output based on the testing of the order management system.

23. The computer program product of claim 22, wherein the computer readable program code further performs parsing the script to extract the test inputs, wherein the test inputs comprise test data and commands that are used to test each sub-system.

* * * * *